United States Patent
Osuki

(10) Patent No.: US 9,092,175 B2
(45) Date of Patent: Jul. 28, 2015

(54) JOB PROCESSING APPARATUS, METHOD AND MEDIUM FOR PROCESSING AND/OR CANCELLING PRINT JOBS

(75) Inventor: Takashi Osuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 13/218,871

(22) Filed: Aug. 26, 2011

(65) Prior Publication Data

US 2012/0050783 A1    Mar. 1, 2012

(30) Foreign Application Priority Data

Aug. 30, 2010 (JP) .................................. 2010-192382

(51) Int. Cl.
G06K 15/02 (2006.01)
G06F 3/12 (2006.01)
H04N 1/00 (2006.01)

(52) U.S. Cl.
CPC ............ *G06F 3/1285* (2013.01); *G06F 3/1204* (2013.01); *G06F 3/1222* (2013.01); *G06F 3/1267* (2013.01); *G06F 3/1274* (2013.01); *H04N 1/00912* (2013.01); *H04N 1/00915* (2013.01); *H04N 2201/0094* (2013.01)

(58) Field of Classification Search
USPC .............................................. 358/1.14, 1.15
See application file for complete search history.

(56) References Cited

U.S. PATENT DOCUMENTS

| | | | |
|---|---|---|---|
| 5,497,320 A * | 3/1996 | Uemoto et al. ............... 715/234 |
| 2003/0020953 A1 * | 1/2003 | Van Den Tillaart et al. . 358/1.15 |
| 2003/0081238 A1 * | 5/2003 | Lester et al. .................. 358/1.14 |
| 2003/0214657 A1 * | 11/2003 | Stringham ...................... 358/1.1 |
| 2006/0262097 A1 * | 11/2006 | Moon ............................ 345/169 |
| 2008/0013123 A1 * | 1/2008 | Yoshioka ...................... 358/1.15 |
| 2008/0124093 A1 | 5/2008 | Kai |
| 2009/0077214 A1 * | 3/2009 | Buster et al. .................. 709/223 |
| 2009/0195815 A1 | 8/2009 | Naito |
| 2011/0075202 A1 * | 3/2011 | Shirai .......................... 358/1.15 |

FOREIGN PATENT DOCUMENTS

| | | |
|---|---|---|
| CN | 1885253 A | 12/2006 |
| CN | 101106622 A | 1/2008 |
| CN | 101500054 A | 8/2009 |
| JP | 11-003004 A | 1/1999 |
| JP | 2003-101688 A | 4/2003 |
| JP | 2005-110714 A | 4/2005 |
| JP | 2007-176048 A | 7/2007 |
| JP | 2008-018622 A | 1/2008 |
| JP | 2009-181467 A | 8/2009 |
| JP | 2010-158791 A | 7/2010 |

OTHER PUBLICATIONS

Machine translation for JP 2009-181467, IDS.*

* cited by examiner

*Primary Examiner* — Qian Yang
(74) *Attorney, Agent, or Firm* — Canon USA Inc. IP Division

(57) ABSTRACT

Job cancellation with a simple operation is prevented depending on a type of a job to be cancelled. A job processing apparatus includes a holding unit configured to hold a job subjected to execution, a receiving unit configured to receive a cancellation instruction for canceling execution of the job held in the holding unit, and a control unit configured to perform control in response to reception of the cancellation instruction by the receiving unit so that when the job held in the holding unit is of a specific type, the job is not canceled and when the job held in the holding unit is of a type other than the specific type, the job is canceled.

10 Claims, 9 Drawing Sheets

FIG. 5A

| EXECUTION ORDER | JOB ID | JOB NAME | JOB TYPE | PRINT SETTING | STATUS |
|---|---|---|---|---|---|
| 1 | 0015 | copy1 | COPY | A4, SINGLE-SIDE | BEING EXECUTED |
| | | | | | |
| | | | | | |
| | | | | | |
| | | | | | |
| | | | | | |

FIG. 5B

| EXECUTION ORDER | JOB ID | JOB NAME | JOB TYPE | PRINT SETTING | STATUS |
|---|---|---|---|---|---|
| 1 | 0015 | copy1 | COPY | A4, SINGLE-SIDE | BEING EXECUTED |
| 2 | 0016 | fax1 | FAX RECEPTION | A4, BOTH-SIDE | EXECUTION WAIT |
| 3 | 0017 | report | AUTO REPORT | A4, BOTH-SIDE | EXECUTION WAIT |
| 4 | 0018 | account settlement | PRINT | A3, SINGLE-SIDE | EXECUTION WAIT |
| | | | | | |
| | | | | | |

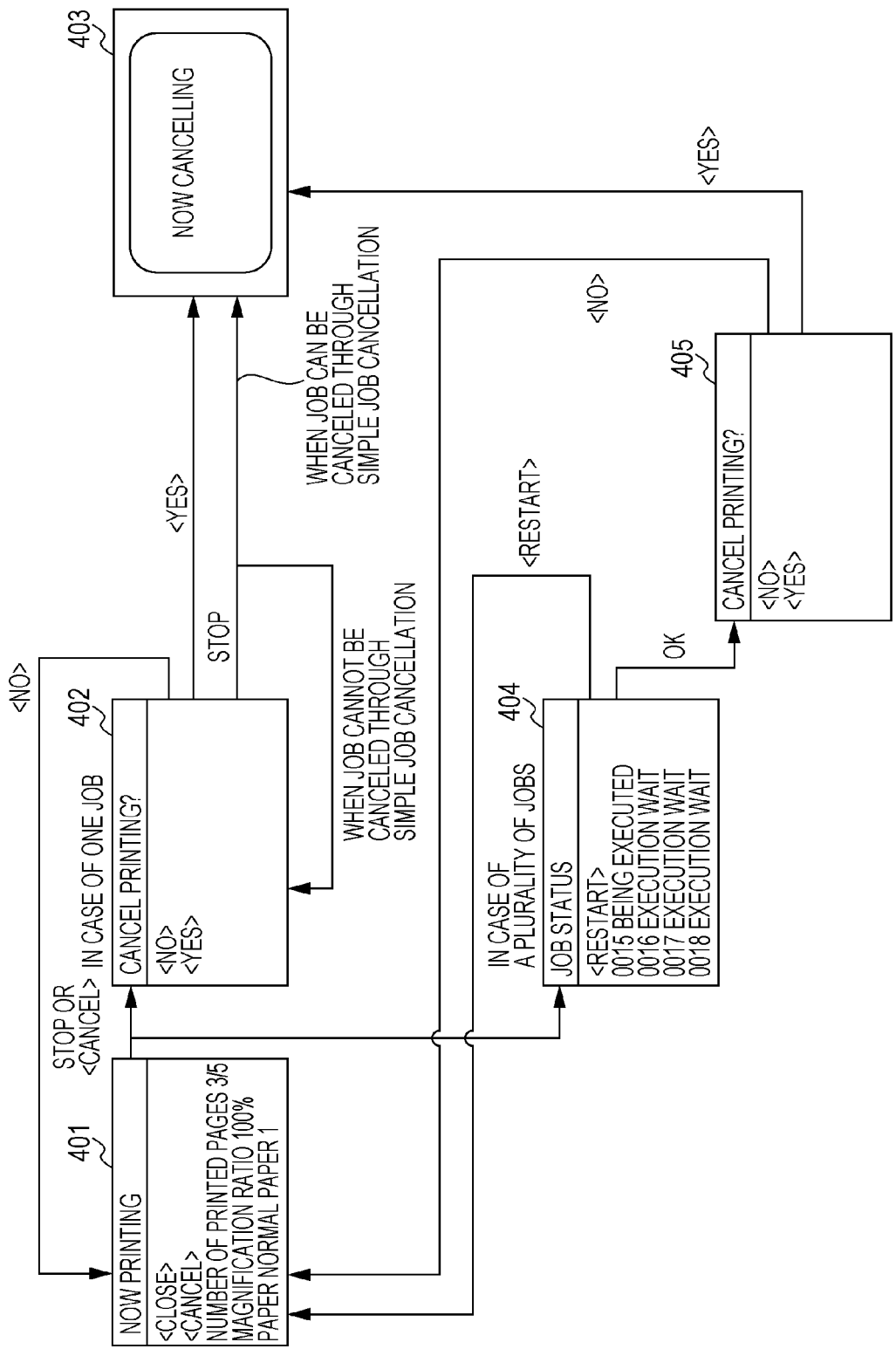

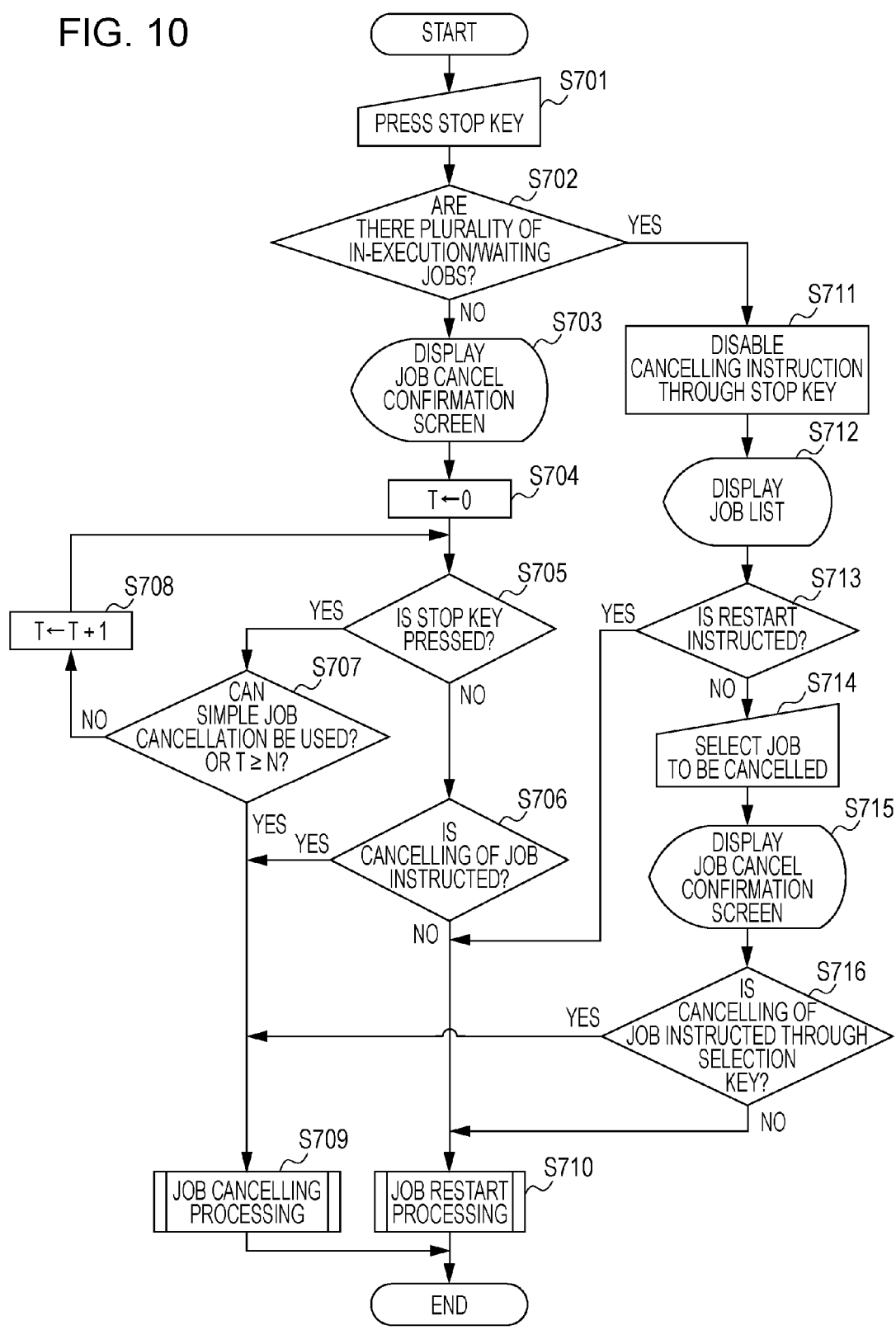

ID
JOB PROCESSING APPARATUS, METHOD AND MEDIUM FOR PROCESSING AND/OR CANCELLING PRINT JOBS

BACKGROUND OF THE INVENTION

1. Field of the Invention

The present invention relates to a job processing apparatus and a computer-readable storage medium.

2. Description of the Related Art

In the related art, a job processing apparatus stores jobs entered by users in a memory thereof and sequentially executes the stored jobs. When canceling a job entered in such a job processing apparatus, the users perform an operation, such as one described in Japanese Patent Laid-Open No. 11-003004, with an operation unit of the job processing apparatus. In this way, the users cancel the job.

More specifically, the following procedure is performed. The users cause the job processing apparatus to display a list of the jobs held therein on a display unit. The users then select a desired job from the displayed job list and instruct the job processing apparatus to cancel the selected job.

However, in the method according to the related art, a job, the cancellation of which has been instructed, is canceled with a simple operation without reference to a type of the job.

Accordingly, even a type of job that may cause inconveniences if it were mistakenly canceled is unfortunately canceled with a simple operation. For example, regarding a facsimile (fax) reception job, users who have instructed cancellation do not have an original document. When the users mistakenly cancel the fax reception job, the users who have instructed the cancellation have to request a sender having the original document to retransmit the image data. This labor becomes a burden on the users who have instructed the cancellation.

For the reasons given above it may be undesirable to cancel all types of jobs with a simple operation.

SUMMARY OF THE INVENTION

In accordance with an aspect of the present invention, a job processing apparatus is provided that includes a holding unit configured to hold a job subjected to execution; a receiving unit configured to receive a cancellation instruction for canceling execution of the job held in the holding unit; and a control unit configured to perform control in response to reception of the cancellation instruction by the receiving unit so that when the job held in the holding unit is of a specific type, the job is not canceled and when the job held in the holding unit is of a type other than the specific type, the job is canceled.

Further features of the present invention will become apparent from the following description of exemplary embodiments with reference to the attached drawings.

BRIEF DESCRIPTION OF THE DRAWINGS

FIGS. 5A and 5B are diagrams illustrating a displayed screen of a job management table according to the first exemplary embodiment of the present invention.

FIG. 6 is a diagram illustrating transition of screens displayed on the operation unit according to the first exemplary embodiment of the present invention.

FIG. 10 is a diagram illustrating a flowchart according to the third exemplary embodiment of the present invention.

DESCRIPTION OF THE EMBODIMENTS

Exemplary embodiments of the present invention will be described below with reference to the accompanying drawings.

First Embodiment

Figure 1:
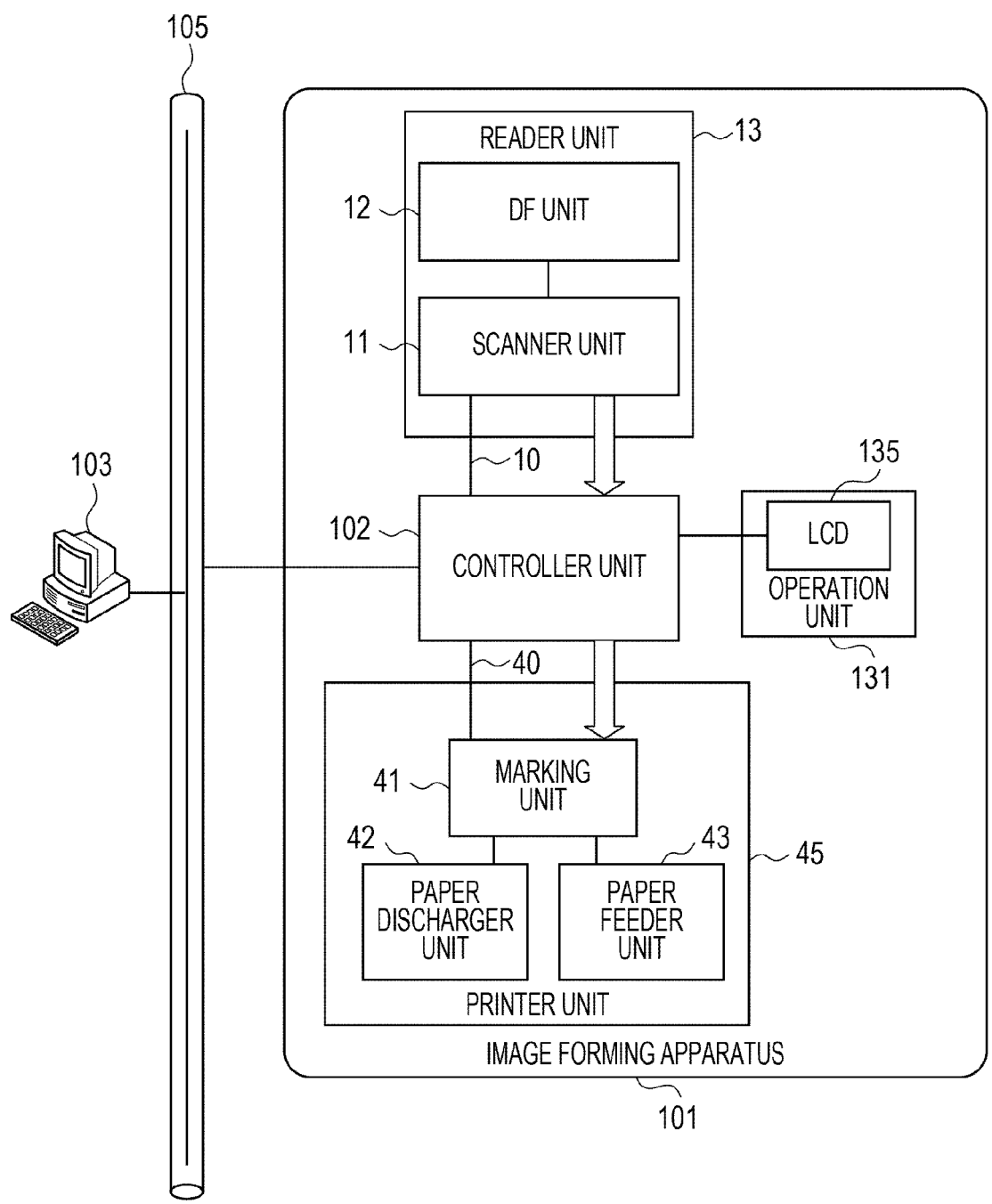
FIG. 1 is a block diagram illustrating a configuration of a job processing system according to a first exemplary embodiment of the present invention.

FIG. 1 is a diagram illustrating a job processing system according to a first exemplary embodiment of the present invention.

The job processing system according to the first exemplary embodiment of the present invention includes a personal computer (PC) 103 and an image forming apparatus 101 serving as an example of a job processing apparatus. The PC 103 and the image forming apparatus 101 are connected to each other via a local area network (LAN) 105.

The image forming apparatus 101, such as a color multifunctional peripheral (MFP), includes a control unit 102, a reader unit 13, a printer unit 45, and an operation unit 131.

The reader unit 13 includes a scanner unit 11 and a document feeder (DF) unit 12.

The scanner unit 11 optically scans an image on an original document and converts the scanned image into image data. The DF unit 12 conveys a set original document to a position where the original document can be scanned by the scanner unit 11.

The scanner unit 11 scans an image on the original document conveyed by the DF unit 12 and converts the scanned image into image data. The scanner unit 11 also includes an original plate, not illustrated, and can also scan an original document set at the original plate.

The printer unit 45 includes a paper feeder unit 43, a marking unit 41, and a paper discharger unit 42.

The paper feeder unit 41 stores sheets for use in printing and conveys each sheet to the marking unit 41. The marking unit 41 performs printing on the basis of image data. More specifically, the marking unit 41 performs printing by transferring and then fixing toners onto the sheets. Meanwhile, the printing method is not limited to this one and a printing method using ink may be used. The paper discharger unit 42 executes post-processing, such as sorting and stapling, on the printed sheets as needed and then discharges the printed sheets.

The operation unit 131 includes a display unit, such as a liquid crystal display (LCD) 135, and hardware keys. The operation unit 131 displays setting screens and a status of the image forming apparatus 101 on the display unit. The operation unit 131 also receives various instructions from users with the hardware keys and sends the received instructions to the control unit 102. Additionally, the operation unit 131 may include a touch panel that is integrated into the LCD 135. When the operation unit 131 includes the touch panel, the operation unit 131 sends instructions received through the touch panel to the control unit 102.

The control unit 102 is connected to the reader unit 13, the printer unit 45, and the operation unit 131 and controls the reader unit 13, the printer unit 45, and the operation unit 131 in an integrated manner. The control unit 102 is also connected to the PC 103 via the LAN 105 and exchanges data with the PC 103. In accordance with instructions received from users through the operation unit 131 or the PC 103, the control unit 102 executes various jobs.

For example, the control unit 102 executes a copy job. More specifically, upon receiving a copy setting and a copy execution start instruction from a user through the operation unit 131, the control unit 102 causes the reader unit 13 to scan an original document. The control unit 102 then receives and stores image data of the original document scanned by the reader unit 13 and performs given image processing in accordance with the copy setting. The control unit 102 then transfers the image data to the printer unit 45 and causes the printer unit 45 to print an image of the image data. When execution of post-processing, such as stapling, is set in the copy setting, the control unit 102 causes the printer unit 45 to execute the post-processing.

In addition to the copy job, the control unit 102 executes a print job. More specifically, the control unit 102 receives image data and a print setting from the PC 103 and causes the printer unit 45 to print an image of the received image data in accordance with the received print setting.

Further, the control unit 102 executes a facsimile (fax) reception job. More specifically, the control unit 102 causes the printer unit 45 to print an image in accordance with image data received through a fax transmission/reception unit 208, which will be described later.

Additionally, the control unit 102 executes a box print job. More specifically, the control unit 102 stores image data in a storage unit, such as a memory unit 207 to be described later, and causes the printer unit 45 to execute printing in accordance with image data selected by users from the pieces of stored image data.

Further, the control unit 102 executes a data transmission job. More specifically, the control unit 102 stores image data of an original document scanned by the reader unit 13 in the storage unit and then transmits the stored image data to the PC 103.

The control unit 102 also executes an automatic report job. The control unit 102 manages an execution history of jobs executed in the image forming apparatus 101 in the storage unit, such as the memory unit 207 to be described later. The control unit 102 causes the printer unit 45 to print the execution history stored in the memory unit 207 whenever a given number of sheets are printed by the printer unit 45 or whenever given time is measured by a timer, not illustrated.

Although the description is given in the first exemplary embodiment for the case where the image forming apparatus 101 is an MFP, the image forming apparatus 101 may be a single functional peripheral (SFP) having a single function. Additionally, the description is given in the first exemplary embodiment for the case where the image forming apparatus 101 is a color device, the image forming apparatus 101 may be a monochrome device.

Figure 2:
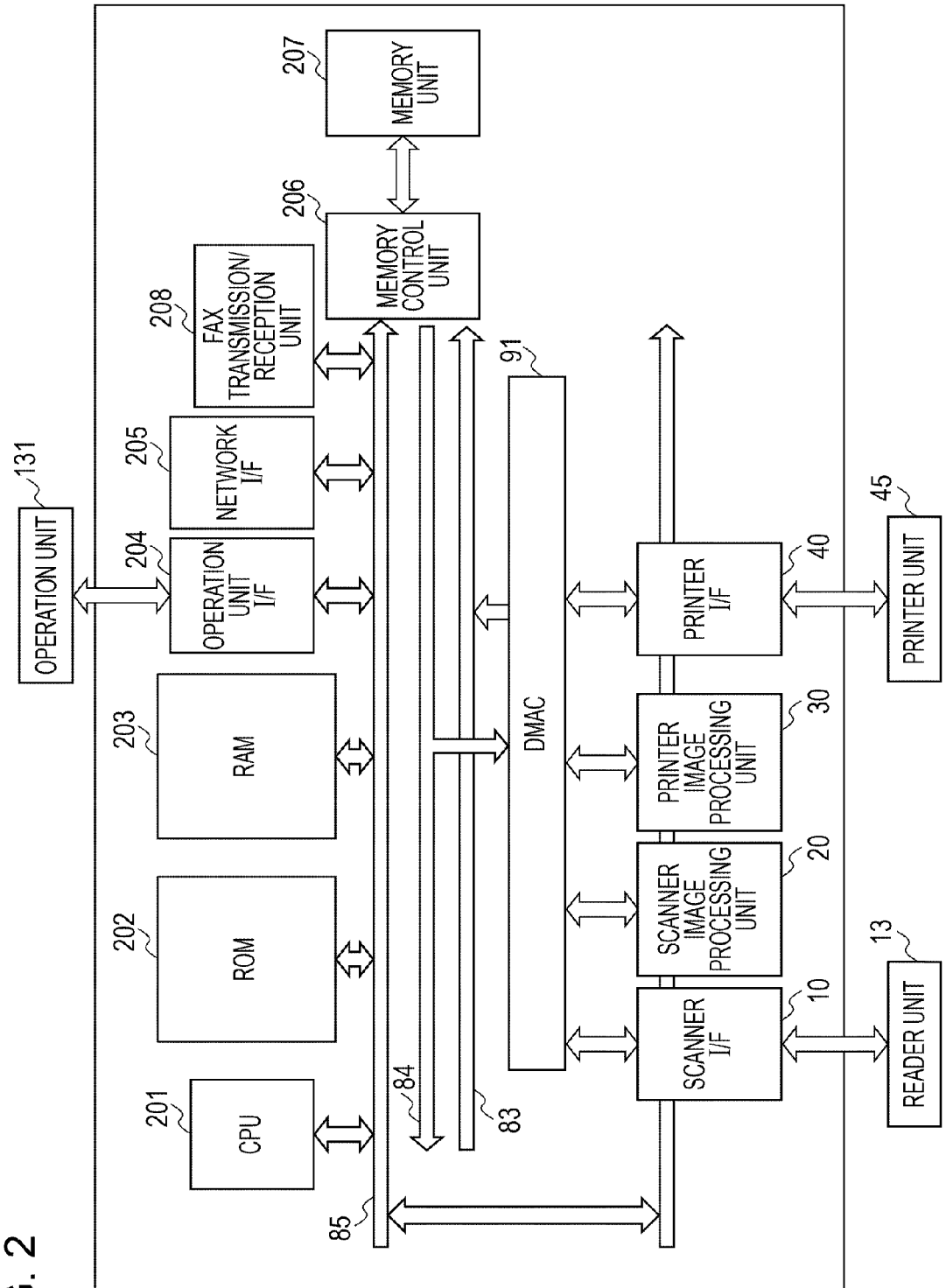
FIG. 2 is a block diagram illustrating a configuration of a control unit according to the first exemplary embodiment of the present invention.

A configuration of such a control unit 102 will now be described with reference to FIG. 2.

A central processing unit (CPU) 201 reads out and executes programs from a read-only memory (ROM) 202 to perform various control operations.

The ROM 202 stores programs read out by the CPU 201.

A random access memory (RAM) 203 functions as a work area of the CPU 201.

An operation-unit interface (I/F) unit 204 controls transmission and reception of data to and from the operation unit 131, respectively. For example, the operation-unit I/F unit 204 transfers display data sent from the CPU 201 to the operation unit 131. The operation-unit I/F unit 204 also delivers an instruction received from a user through the operation unit 131 to the CPU 201.

A network I/F unit 205 controls transmission and reception of data when the CPU 201 communicates with an external apparatus (e.g., the PC 103) via the LAN 105.

A memory control unit 206 is connected to a first bus 83, a second bus 84, and a third bus 85. The memory control unit 206 controls data transfer for writing data in or reading data from the memory unit 207.

The memory unit 207 stores image data. The memory unit 207 also stores, as a job, image data and setting values used in processing the image data. The memory unit 207 can store a plurality of jobs. The jobs stored in the memory unit 207 are sequentially executed by the CPU 201. Accordingly, the memory unit 207 functions as a holding unit that holds jobs subjected to execution until the jobs are executed.

A scanner I/F unit 10 is connected to the reader unit 13 and controls transmission and reception of data to and from the reader unit 13, respectively. For example, the scanner I/F unit 10 transfers a command from the CPU 201 to the reader unit 13 and transfers image data of an original document scanned by the reader unit 13 to the memory control unit 206.

A scanner image processing unit 20 executes image processing on image data, that is received by the scanner I/F unit 10 and written in the memory unit 207, in accordance with a user setting. For example, when monochrome copy is set by a user, the scanner image processing unit 20 converts color image data scanned by the reader unit 13 into monochrome image data.

A printer image processing unit 30 performs image processing to convert image data into data that can be printed by the printer unit 45.

A printer I/F unit 40 is connected to the printer unit 45 and controls transmission and reception of data to and from the printer unit 45, respectively. For example, the printer I/F unit 40 outputs image data to be printed to the printer unit 45.

A direct memory access controller (DMAC) 91 controls data transfer between the memory control unit 206 and the scanner I/F unit 10, the scanner image processing unit 20, the printer image processing unit 30, and the printer I/F unit 40.

Figure 3:
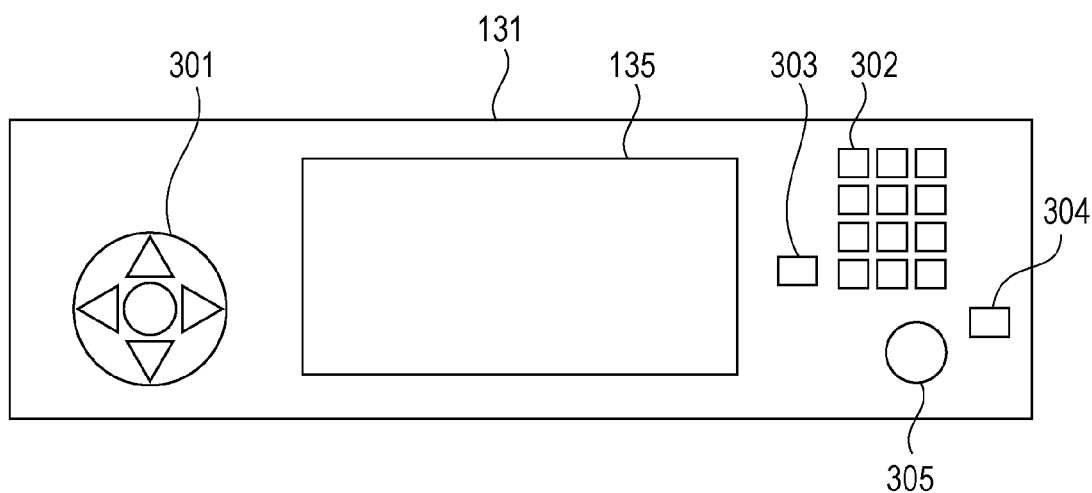
FIG. 3 is a diagram illustrating a configuration of an operation unit according to the first exemplary embodiment of the present invention.

A configuration of the operation unit 131 will be described with reference to FIG. 3.

The operation unit 131 includes the LCD 135, a selection key set 301, a numeral keypad 302, a reset key 303, a stop key (or a cancel key) 304, and a start key 305. The keys 301 to 305 in the first exemplary embodiment are provided as hardware keys.

The LCD 135 displays various screens on the basis of instructions from the control unit 102.

The selection key set 301 includes an up key, a down key, a left key, a right key, and a set key. Users use the up, down, left, and right keys to move a cursor in a menu screen displayed on the LCD 135 and press the set key to determine an item selected with the cursor.

The numeral keypad 302 is for receiving input of numerical values, such as the number of copies to be printed, from users.

The reset key 303 is for clearing currently set setting values to return the setting back to an initial state.

The start key 305 is for receiving requests for executing various jobs, such as a copy job, a print job, and a data transmission job, from users by the image forming apparatus 101.

The stop key 304 is for receiving an instruction for canceling a job, execution of which has been requested, (a cancellation instruction) from users.

An example of a screen displayed on the LCD 135 will now be described with reference to FIG. 4.

Figure 4:
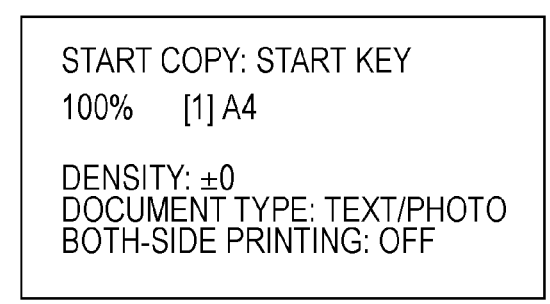
FIG. 4 is a diagram illustrating a screen displayed on the operation unit according to the first exemplary embodiment of the present invention.

An initial screen illustrated in FIG. 4 is displayed when the image forming apparatus 101 is turned on or when the reset key 303 is pressed.

Users operate the selection key set 301 to perform copy setting while watching the screen illustrated in FIG. 4. In the example screen illustrated in FIG. 4, the users can set an "enlargement/reduction ratio", a "paper size", a "density", a "document type", and "both-side printing".

The enlargement/reduction ratio is an item that the users can specify a value between 0% and 200%. The control unit 102 changes size of image data of an original document scanned by the reader unit 13 in accordance with the specified enlargement/reduction ratio before an image is printed on a sheet.

The paper size is an item that the users can specify from A4, A3, B4, B5, and so forth. The control unit 102 feeds a sheet of the specified paper size from the paper feeder unit 43 before printing.

Additionally, the users operate various items to set the density, the document type, and the both-side printing.

The control unit 102 stores these setting values in the memory unit 207. Upon receiving an instruction for changing the setting values through the operation unit 131, the control unit 102 changes the content displayed on the LCD 135 and the setting values stored in the memory unit 207 in accordance with the instruction.

When the start key 305 is pressed with the setting values being changed, the control unit 102 causes the reader unit 13 to scan an image on an original document and stores the scanned image data in the memory unit 207. The control unit 102 then generates a job by associating the stored image data with the setting values and stores the generated job in the memory unit 207.

The control unit 102 also registers information on the job held in the memory unit 207 in a job management table (see FIGS. 5A and 5B) that is managed in the memory unit 207. Thereafter, the control unit 102 manages a job execution status and execution order in accordance with the job information registered in the job management table.

FIGS. 5A and 5B illustrate the job management table.

Information contained in this job management table is updated by the control unit 102 once the control unit 102 receives a job, once execution of a job completes, and once a job is cancelled.

When a job is stored in the memory unit 207 in response to pressing of the start key 305, the control unit 102 first registers job information in the job management table, such as one illustrated in FIG. 5A.

Parameters, such as execution order, a job ID, a job name, a job type, a print setting, and a status, are managed for each job in the job management table.

Jobs registered in the job management table are executed by the control unit 102 in accordance with the execution order. More specifically, jobs are executed in ascending order of the execution order. After execution of a job completes, the completed job is deleted from the job management table and the execution order of the other jobs is decremented (decreased).

The job ID is a code that is assigned to a job by the control unit 102 upon generation of the job in order to uniquely identify the job.

The job name is assigned to a job. For copy jobs, names "copy 1", "copy 2", "copy 3", . . . are automatically assigned to the copy jobs by the control unit 102. For jobs received from the PC 103, a file name generated by application software of the PC 103 is registered as the job name in the job management table.

The job type is information indicating a type of a job. Upon receiving a job, the control unit 102 identifies a type of the job and registers information indicating the identified job type in the job management table. The job types include a copy job, a fax transmission job, a fax reception job, an image data transmission job, a print job, and automatic report job. So preferably the image forming apparatus can perform two or more of the aforementioned job types.

The print setting is received from users through the operation unit 131 or a printer driver of the PC 103.

The status is a value indicating an execution status of each job. More specifically, types of the status include "being executed", "execution wait", "stopped", and "being canceled". The status is managed by the control unit 102.

FIG. 5A illustrates a state in which a job having a job ID "0015" is registered in the job management table.

A single job is illustrated in FIG. 5A and the job "0015" is being executed by the control unit 102. The status of the job is "being executed". This status indicates that the control unit 102 is currently executing processing in which the control unit 102 causes the reader unit 13 to scan image data of an original document, performs image processing, and then causes the printer unit 45 to execute single-side printing on a A4-size sheet.

FIG. 5B illustrates the job management table after the control unit 102 further receives other jobs in the state illustrated in FIG. 5A and stores the jobs in the memory unit 207 as jobs subjected to execution.

Four jobs are illustrated in FIG. 5B. The job "0015" is being executed by the control unit 102 and the status thereof is "being executed". The status of the other jobs is "execution wait", which indicates that each job is held in the memory unit 207 but is not yet executed by the control unit 102.

Transition of screens displayed in the operation unit 131 of the image forming apparatus 101 will now be described with reference to FIG. 6. This screen transition is controlled by the CPU 201 in accordance with a program in the ROM 202.

A status screen 401 illustrated in FIG. 6 shows an execution status of a job that is being executed.

The status screen 401 is displayed once the start key 305 is pressed with the screen illustrated in FIG. 4 being displayed. When a user wants to return this screen back to the screen illustrated in FIG. 4, the user may select <CLOSE> with the selection key set 301 or press the reset key 303.

The status screen 401 displays selection items, such as <CLOSE> and <CANCEL>. The status screen 401 also displays setting values regarding the currently executed job.

When the user wants to cancel the currently executed job, the user can cancel the job by operating the cursor with the selection key set 301 to move the cursor to <CANCEL> and then pressing the set key. When the user presses the stop key 304 with the status screen 401 being displayed, the control unit 102 performs an operation that is similar to the one performed when the cursor is moved to <CANCEL> and then the set key is pressed. In this way, the user can rapidly inform the control unit 102 of their intention to cancel the job without selecting the item with the cursor.

When <CANCEL> is selected in this status screen 401 or when the stop key 304 is pressed, the control unit 102 temporarily suspends all jobs subjected to execution held in the memory unit 207. The control unit 102 then determines the number of jobs held in the memory unit 207. Upon determining that a single job is held, the control unit 102 causes the LCD 135 to display a cancel confirmation screen 402. Upon determining that a plurality of jobs are held, the control unit 102 causes the LCD 135 to display a selection screen 404.

The cancel confirmation screen 402 displays selection items, such as <NO> and <YES>. When the user wants to cancel the currently executed job, the user operates the selection key set 301 to select <YES> and then presses the set key. On the other hand, when the user does not want to cancel the currently executed job, the user selects <NO> and then presses the set key.

When the set key is pressed with <YES> is being selected, the control unit 102 cancels the job held in the memory unit 207. While canceling the job, the control unit 102 causes the LCD 135 to display a cancel execution screen 403. On the other hand, when the set key is pressed with <NO> being selected, the control unit 102 causes the LCD 135 to display the status screen 401 without canceling the job held in the memory unit 207. When <NO> is selected, the control unit 102 restarts executing the job while causing the LCD 135 to display the status screen 401.

The user can also cancel the job by pressing the stop key 304 with the cancel confirmation screen 402 being displayed. In contrast to the case where the set key is pressed with <YES> in the cancel confirmation screen 402 being selected, to cancel the currently executed job by pressing the stop key 304 with the cancel confirmation screen 402 being displayed is referred to as simple job cancellation.

Here, when a single job subjected to execution is held in the memory unit 207, the user can easily cancel the job by pressing the stop key 304 twice with the status screen 401 being displayed. However, the user may mistakenly press the stop key 304 twice. In such a case, it is not desirable to cancel certain types of jobs, such as a fax reception job for receiving and printing a fax and an automatic report job for printing, as a report, an execution history of jobs executed in the image forming apparatus 101, because of the following reasons. In a case of the fax reception job, when the job is mistakenly canceled, the user has to contact a sender to ask retransmission of the original document. Accordingly, the user has to perform a troublesome work. In addition, the automatic report job is a function for reporting the execution history every time a given number of copies are printed or every time given time elapses. When the automatic report job is mistakenly canceled, the automatic report job is not executed until the next execution timing. Accordingly, a manager who checks the execution history of the image forming apparatus 101 with the report may miss timing for checking the execution history.

To avoid this situation, in the first exemplary embodiment, the control unit 102 (functioning as a determining unit) determines whether simple job cancellation is permitted for the currently executed job when the stop key 304 is pressed with the cancel confirmation screen 402 being displayed. More specifically, this determination is performed in step S506 of FIG. 7, which will be described later. When the type of the job to be cancelled is the fax reception job or the automatic report job, the control unit 102 determines that the simple job cancellation is "not permitted". On the other hand, when the job to be canceled is of types other than the fax reception job and the automatic report job, the control unit 102 determines that the simple job cancellation is "permitted".

Meanwhile, determination of whether the simple job cancellation is permitted on the basis of the job types, such as the fax reception job and the automatic report job, is merely an example.

Whether the simple job cancellation is permitted may be determined on the basis of other conditions.

For example, when a box print job is executed, whether or not to delete data stored in a box (i.e., a specific area in the memory unit 207) after execution of the box print job can be previously set. When the currently executed job is the box print job and the setting is made so that the data stored in the box is deleted after execution of the box print job, the control unit 102 determines that the simple job cancellation is "not permitted" for the job. On the other hand, when the currently executed job is the box print job and the setting is made so that the data stored in the box is not deleted after execution of the box print job, the control unit 102 determines that the simple job cancellation is "permitted". By controlling the operation in this manner, the control unit 102 can restrict the simple job cancellation when the original image data of the box print job is deleted once the box print job is mistakenly canceled. Accordingly, the control unit 102 may restrict simple job cancellation of a job not only on the basis of the type of the job to be canceled but also when data needed in re-execution of the job is lost as a result of cancellation of the job.

For example, information on a user ID and a department is managed in association with a job in the job management table illustrated in FIGS. 5A and 5B. The control unit 102 may restrict cancellation of the job when the job is associated with a specific user ID or a specific department. More specifically, the control unit 102 receives, from the external PC 103, information indicating a user ID or a department with a job and manages the information indicating the user ID or the department in association with the job. Upon receiving a simple job cancellation instruction from a user, the control unit 102 may restrict cancellation of the job when the job to be cancelled is managed in association with the information indicating the specific user ID or the specific department. On the other hand, upon receiving a simple job cancellation instruction from a user, the control unit 102 may cancel a job when the job to be cancelled is managed in association with information indicating a user ID other than the specific user ID or a department other than the specific department.

In addition, information indicating the job type, the specific user ID, and the specific department, based on which cancellation is restricted, may be set in advance by users through the operation unit 131 and the external PC 103.

When the control unit 102 determines that the simple job cancellation is not permitted using the above-described methods, the control unit 102 does not cancel the job but maintains the display state of the cancel confirmation screen 402. When the control unit 102 determines that the simple job cancellation is permitted, the control unit 102 cancels the job held in the memory unit 207. While canceling the job, the control unit 102 causes the LCD 135 to display the cancel execution screen 403.

With such control, users can rapidly inform the control unit 102 of their intention to cancel a job by operating the stop key 304 without selecting an item with a cursor when simple job cancellation is permitted for the job. Additionally, the control unit 102 can prevent a job for which the simple job cancellation is not permitted from being accidentally cancelled when the users mistakenly press the stop key 304 twice. Further, even when the simple job cancellation is not permitted for a job, the users can cancel the job by selecting <YES> with the cursor in the cancel confirmation screen 402. In this way, the users can inform the control unit 102 of their intention to cancel the job.

After cancellation of the job completes, the initial screen illustrated in FIG. 4 is displayed.

On the other hand, if a plurality of jobs are held when <CANCEL> is selected in the status screen 401 or when the stop key 304 is pressed, the selection screen 404 is displayed. When the selection screen 404 is displayed, the control unit 102 receives selection of a job to be canceled from a user.

The selection screen 404 displays a selection item <RESTART>. A list of the jobs held in the memory unit 207 is also displayed by the control unit 102 on the basis of the job management table.

When the user wants to restart execution of the temporarily suspended job, the user operates the selection key set 301 to select <RESTART> and then presses the set key. When the set key is pressed with <RESTART> being selected, the control unit 102 restarts executing the temporarily suspended job and returns the selection screen 404 back to the status screen 401.

On the other hand, when the user wants to cancel one of the plurality of jobs held in the memory unit 207, the user operates the selection key set 301 to select one of the jobs and then presses the set key, thereby instructing the control unit 102 to cancel the job. When cancellation of the job is instructed, the control unit 102 causes the LCD 135 to display a cancel confirmation screen 405. Meanwhile, the control unit 102 performs control so that the job is not canceled when the stop key 304 is pressed with the selection screen 404 being displayed. This is because, when a plurality of jobs are held in the memory unit 207, it is difficult for the control unit 102 to identify a job that the user wants to cancel from the plurality of jobs.

As in the cancel confirmation screen 402, the cancel confirmation screen 405 displays selection items, such as <NO> and <YES>. When the user wants to cancel the job selected in the selection screen 404, the user operates the selection key set 301 to select <YES> and then presses the set key. On the other hand, when the user does not want to cancel the job selected in the selection screen 404, the user selects <NO> and then presses the set key.

When the set key is pressed with <YES> is being selected, the control unit 102 cancels the job selected in the selection screen 404 and causes the LCD 135 to display the cancel execution screen 403. On the other hand, when the set key is pressed with <NO> being selected, the control unit 102 causes the LCD 135 to display the status screen 401.

After cancellation of the job completes, the control unit 102 executes a following job and displays a status of the executed job on the status screen 401.

By performing control in this way, the control unit 102 can execute cancellation processing suitable for the number of jobs held in the memory unit 207.

For example, when a single job is held in the memory unit 207, the user can rapidly cancel the job by pressing the stop key 304 twice with the status screen 401 being displayed.

On the other hand, when the user presses the stop key 304 twice and a plurality of jobs are held in the memory unit 207, the control unit 102 can prevent a job that is not intended by the user out of the plurality of jobs held in the memory unit 207 from being canceled.

The description has been given in the first exemplary embodiment for the case where the control unit 102 cancels a job held in the memory unit 207 in response to pressing of the stop key 304 twice with the status screen 401 being displayed. However, the present invention is not limited by this case and the control unit 102 may cancel the job held in the memory unit 207 in response to pressing of the stop key 304 twice with the screen illustrated in FIG. 4 being displayed.

Figure 7:
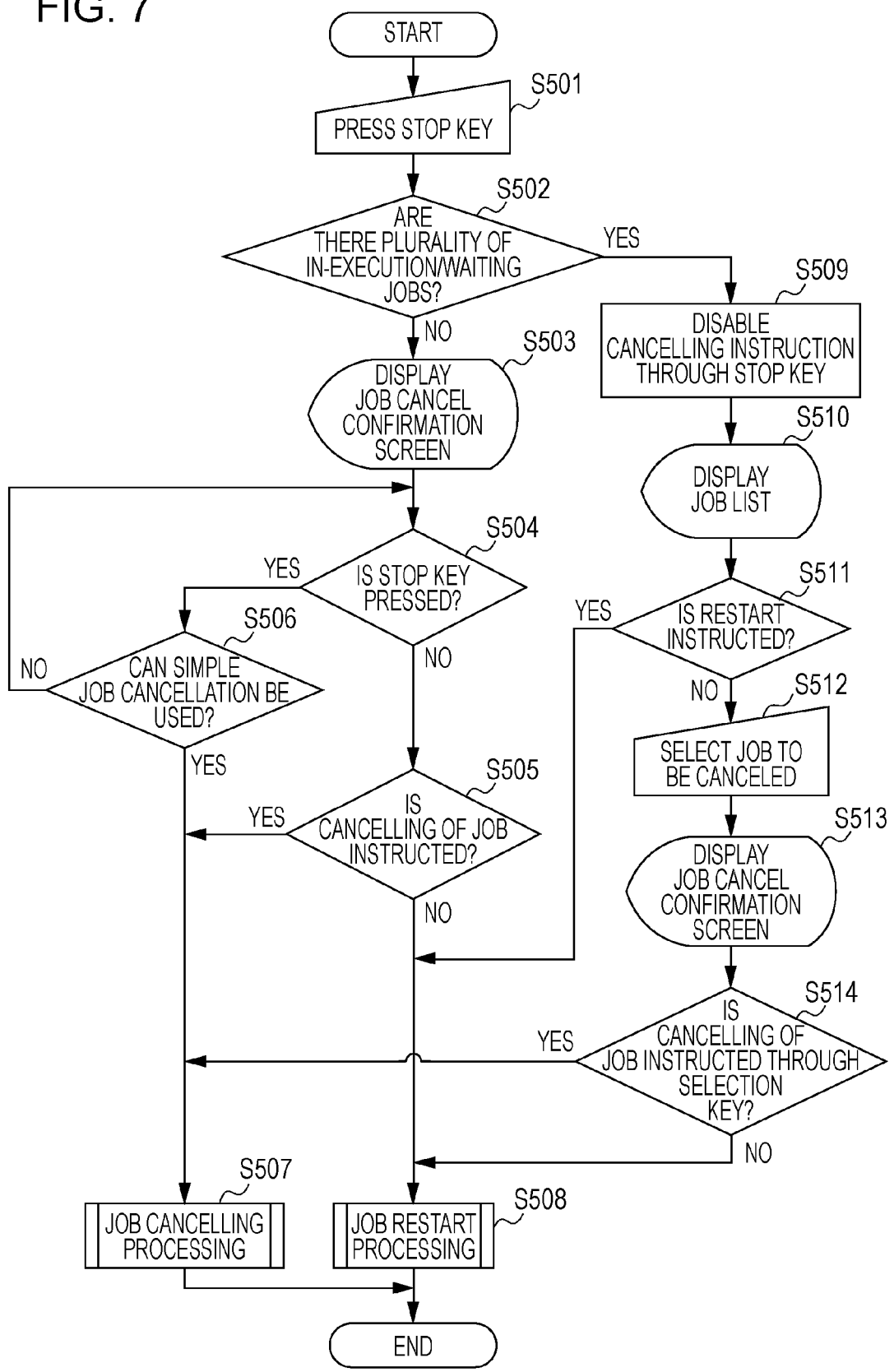
FIG. 7 is a diagram illustrating a flowchart according to the first exemplary embodiment of the present invention.

A procedure of processing executed by the control unit 102 in response to pressing of the stop key 304 will now be described with reference to a flowchart of FIG. 7. Meanwhile, the CPU 201 of the control unit 102 reads out and executes a program stored in the ROM 202, whereby the processing illustrated in the flowchart of FIG. 7 is performed.

First, in step S501, the control unit 102 detects pressing of the stop key 304. Upon detecting pressing of the stop key 304 in step S501, the control unit 102 temporarily suspends jobs held in the memory unit 207. The process proceeds to step S502.

In step S502, the controller unit 201 determines whether a single job or a plurality jobs are held in the memory unit 207 on the basis of the job management table. When the control unit 102 determines that a single job is held, the process proceeds to step S503. When the control unit 102 determines that a plurality of jobs are held, the process proceeds to step S509.

In step S503, the control unit 102 causes the LCD 135 to display the cancel confirmation screen 402 and stands by for an instruction from a user. Once the control unit 102 receives the instruction from the user, the process proceeds to step S504.

In step S504, the control unit 102 determines whether the stop key 304 is pressed. Once the control unit 102 determines that the stop key 304 is pressed, the process proceeds to step S506. Once the control unit 102 determines that the stop key 304 is not pressed, the process proceeds to step S505.

In step 506, the control unit 102 determines whether simple job cancellation is permitted for the job to be cancelled. More specifically, the control unit 102 performs the determination using the methods having been described with reference to FIG. 6. When the control unit 102 determines that the simple job cancellation is permitted, the process proceeds to step S507. When the control unit 102 determines that the simple job cancellation is not permitted, the process returns to step S504.

In step S507, the control unit 102 cancels the job held in the memory unit 207 and terminates the processing. At this time, the control unit 102 causes the LCD 135 to display the cancel execution screen 403.

When the process proceeds to step S505, the control unit 102 determines whether an instruction for cancelling the job is received. More specifically, the control unit 102 determines whether the set key is pressed with <YES> in the cancel confirmation screen 402 being selected. When it is determined that the set key is pressed with <YES> being selected, the process proceeds to step S507. In step S507, the control unit 102 cancels the job held in the memory unit 207 and terminates the processing.

When it is determined that the set key is pressed with <NO> being selected, the process proceeds to step S508. In step S508, the control unit 102 restarts executing the job held in the memory unit 207 and terminates the processing. At this time, the control unit 102 causes the LCD 135 to display the status screen 401.

On the other hand, when the process proceeds from step S502 to step S509, the control unit 102 disables a cancellation instruction with the stop key 304 in step S509. That is, the control unit 102 performs control so that the job stored in the memory unit 207 is not cancelled even when the control unit 102 receives the cancellation instruction with the stop key 304 after step S509 until the processing of the flowchart illustrated in FIG. 7 terminates.

In step S510, the control unit 102 then causes the LCD 135 to display the selection screen 404.

In step S511, the control unit 102 determines whether the set key is pressed with <RESTART> being selected. When the control unit 102 determines that the set key is pressed with <RESTART> being selected, the process proceeds to step S508. In step S508, the control unit 102 restarts executing the job held in the memory unit 207 and terminates the processing.

On the other hand, when the set key is not pressed with <RESTART> being selected, the process proceeds to step S512. In step S512, the control unit 102 stands by until the set key is pressed with one of the plurality of jobs displayed in the selection screen 404 being selected.

When the set key is pressed with one of the plurality of jobs displayed in the selection screen 404 being selected, the process proceeds to step S513. In step S513, the control unit 102 causes the LCD 135 to display the cancel confirmation screen 405. The process then proceeds to step S514.

In step S514, the control unit 102 determines whether an instruction for canceling the job is received. More specifically, the control unit 102 determines whether the set key is pressed with <YES> in the cancel confirmation screen 405 being selected. When it is determined that the set key is pressed with <YES> being selected, the process proceeds to step S507. In step S507, the control unit 102 cancels the job held in the memory unit 207 and terminates the processing.

On the other hand, it is determined that the set key is pressed with <NO> being selected, the process proceeds to step S508. In step S508, the control unit 102 restarts executing the job held in the memory unit 207 and terminates the processing.

As described above, once the stop key 304 is pressed, the control unit 102 determines whether a single job or a plurality of jobs are held in the memory unit 207. Upon determining that a single job is held, the control unit 102 displays the cancel confirmation screen 402 instead of the selection screen 404. When a user instructs the control unit 102 to cancel the job with the cancel confirmation screen 402 being displayed, the control unit 102 determines whether simple job cancellation is permitted for the job held in the memory unit 207. When the simple job cancellation is permitted, the control unit 102 cancels the job. Upon determining that the simple job cancellation is not permitted, the control unit 102 forbids the job from being canceled.

On the other hand, upon determining that a plurality of jobs are held in the memory unit 207, the control unit 102 displays the selection screen 404 and receives selection of a job to be canceled from the user. After receiving selection of the job to be canceled, the control unit 102 displays the cancel confirmation screen 405. When the user instructs the control unit 102 to cancel the job with the cancel confirmation screen 405 being displayed, the control unit 102 cancels the job.

As described above, the control unit 102 can perform rapid cancellation processing in accordance with the number of jobs held in the memory unit 207 by reducing the number of steps for canceling job when a single job is held compared to when a plurality of jobs are held.

Additionally, when the user mistakenly presses the stop key 304 twice, the control unit 102 can prevent a job that should not be canceled from being accidentally canceled and allow the user to select a job that the user wants to cancel.

Although the description has been given in the first exemplary embodiment for the case of displaying the cancel confirmation screens 402 and 405, displaying of the cancel confirmation screens 402 and 405 may be skipped and the cancel execution screen 403 may be displayed. Additionally, it may be configured that the user can select whether to display the cancel confirmation screens 402 and 405.

Additionally, the description has been given in the first exemplary embodiment for the case of automatically displaying the status screen 401 in response to reception of a job execution request with the start key 305. However, the present invention is not limited by this configuration and a key for displaying the status screen 401 may be provided in the operation unit 131 and the status screen 401 may be displayed in response to pressing of the key.

Second Embodiment

In the first exemplary embodiment, whether simple job cancellation is permitted is determined whenever a stop key 304 is pressed twice (so the determination is performed after the stop key 304 is pressed for the second time). In a second exemplary embodiment, a description will be given for an example in which whether simple job cancellation is permitted for a target job is determined after the stop key 304 is pressed for the first time and a cancellation instruction with the stop key 304 is disabled when it is determined that the simple job cancellation is "not permitted". In this way, a control unit 102 does not have to determine whether the simple job cancellation is permitted every time the stop key 304 is pressed.

A description will be given, with reference to a flowchart of FIG. 8, for control processing for determining whether simple job cancellation is permitted for a target job after the stop key 304 is pressed for the first time and invalidating a cancellation instruction with the stop key 304 when the simple job cancellation is "not permitted".

A configuration of a job processing system (FIG. 1), a configuration of the control unit 102 (FIG. 2), a configuration of an operation unit 131 (FIG. 3), a screen displayed on the operation unit 131 (FIG. 4), a display screen of a job management table (FIGS. 5A and 5B), and transition of screens displayed on the operation unit 131 (FIG. 6) in accordance with the second exemplary embodiment are similar to those in accordance with the first exemplary embodiment.

Figure 8:
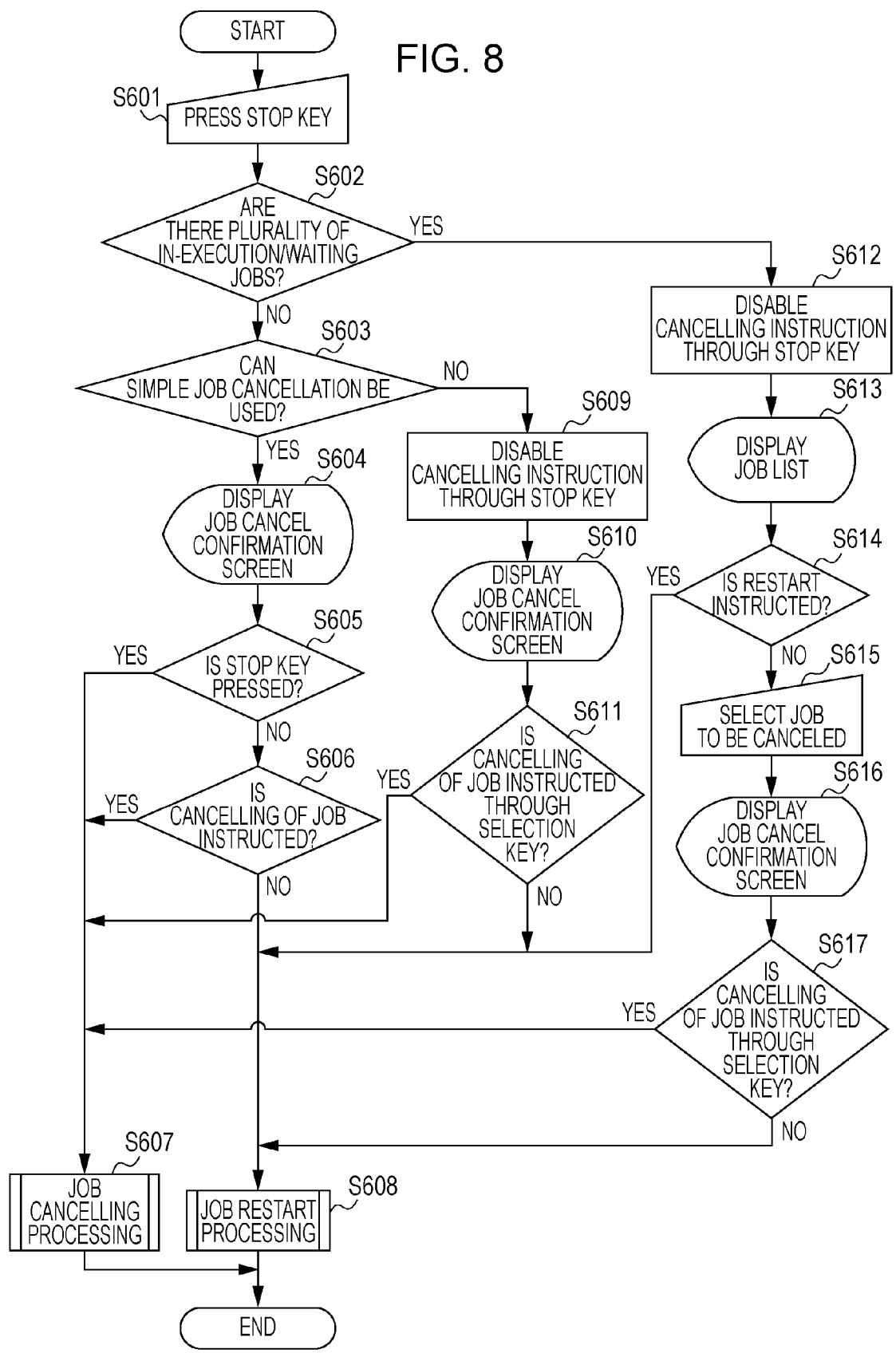
FIG. 8 is a diagram illustrating a flowchart according to a second exemplary embodiment of the present invention.

Meanwhile, a CPU 201 of the control unit 102 reads out and executes a program stored in a ROM 202, whereby the processing illustrated in the flowchart of FIG. 8 is performed.

First, in step S601, the control unit 102 detects pressing of the stop key 304. Upon detecting pressing of the stop key 304 in step S601, the control unit 102 temporarily suspends jobs held in a memory unit 207. The process proceeds to step S602.

In step S602, the control unit 102 determines whether a single job or a plurality of jobs are held in the memory unit 207 on the basis of the job management table. When the control unit 102 determines that a single job is held, the process proceeds to step S603. When the control unit 102 determines that a plurality of jobs are held, the process proceeds to step S612.

In step S603, the control unit 102 (functioning as a determining unit) determines whether simple job cancellation is permitted for the job to be cancelled (i.e., the single job held in the memory unit 207). More specifically, the control unit 102 performs the determination using the methods having been described with reference to FIG. 6. When the control unit 102 determines that the simple job cancellation is not permitted, the process proceeds to step S609. When the control unit 102 determines that the simple job cancellation is permitted, the process proceeds to step S604.

In step S604, the control unit 102 causes an LCD 135 to display a cancel confirmation screen 402 and stands by for an instruction from a user. Once the control unit 102 receives the instruction from the user, the process proceeds to step S605.

In step S605, the control unit 102 determines whether the stop key 304 is pressed. When the control unit 102 determines that the stop key 304 is pressed, the process proceeds to step S607. When the control unit 102 determines that the stop key 304 is not pressed, the process proceeds to step S606.

In step S607, the control unit 102 cancels the job held in the memory unit 207 and terminates the processing. At this time, the control unit 102 causes the LCD 135 to display a cancel execution screen 403.

On the other hand, when the process proceeds to step S606, the control unit 102 determines whether an instruction for canceling the job is received. More specifically, the control unit 102 determines whether a set key is pressed with <YES> in the cancel confirmation screen 402 being selected. When it is determined that the set key is pressed with <YES> being selected, the process proceeds to step S607. In step S607, the control unit 102 cancels the job held in the memory unit 207 and terminates the processing.

When it is determined that the set key is pressed with <NO> being selected, the process proceeds to step S608. In step S608, the control unit 102 restarts executing the job held in the memory unit 207 and terminates the processing. At this time, the control unit 102 causes the LCD 135 to display a status screen 401.

On the other hand, when the process proceeds from step S603 to S609, the control unit 102 disables a cancellation instruction with the stop key 304 in step S609. That is, the control unit 102 performs control so that the job stored in the memory unit 207 is not canceled even when the cancellation instruction with the stop key 304 is received after step S609 until the processing of the flowchart illustrated in FIG. 8 terminates.

The process then proceeds to step S610. The control unit 102 causes the LCD 135 to display a cancel confirmation screen 405 and the process proceeds to step S611. In step S611, the control unit 102 determines whether an instruction for canceling the job is received. More specifically, the control unit 102 determines whether the set key is pressed with <YES> in the cancel confirmation screen 405 being selected. When it is determined that the set key is pressed with <YES> being selected, the process proceeds to step S607. In step S607, the control unit 102 cancels the job held in the memory unit 207 and terminates the processing.

On the other hand, when it is determined that the set key is pressed with <NO> being selected, the process proceeds to step S608. In step S608, the control unit 102 restarts executing the job held in the memory unit 207 and terminates the processing.

Additionally, when the process proceeds from step S602 to step S612, the control unit 102 disables the cancellation instruction with the stop key 304 in step S612. That is, the control unit 102 performs control so that the job stored in the memory unit 207 is not canceled even when the cancellation instruction with the stop key 304 is received after step S612 until the processing of the flowchart illustrated in FIG. 8 terminates.

In step S613, the control unit 102 causes the LCD 135 to display a selection screen 404.

Next, in step S614, the control unit 102 determines whether the set key is pressed with <RESTART> being selected. When the control unit 102 determines that the set key is pressed with <RESTART> being selected, the process proceeds to step S608. In step S608, the control unit 102 restarts executing the job held in the memory unit 207 and terminates the processing.

On the other hand, when the set key is not pressed with <RESTART> being selected, the process proceeds to step S615. In step S615, the control unit 102 stands by until the set key is pressed with one of the plurality of jobs displayed in the selection screen 404 being selected.

When the set key is pressed with one of the plurality of jobs displayed in the selection screen 404 being selected, the process proceeds to step S616 and the control unit 102 causes the LCD 135 to display the cancel confirmation screen 405. The process then proceeds to step S617.

In step S617, the control unit 102 determines whether an instruction for canceling the job is received. More specifically, the control unit 102 determines whether the set key is pressed with <YES> in the cancel confirmation screen 405 being selected. When it is determined that the set key is pressed with <YES> being selected, the process proceeds to step S607. In step S607, the control unit 102 cancels the job held in the memory unit 207 and terminates the processing.

On the other hand, when it is determined that the set key is pressed with <NO> being selected, the process proceeds to step S608. In step S608, the control unit 102 restarts executing the job held in the memory unit 207 and terminates the processing.

As described above, in the second exemplary embodiment, even when a single job is held but simple job cancellation is not permitted for the job to be canceled, the control unit 102 disables a job cancellation instruction with the stop key 304 after the stop key 304 is pressed for the second time. Accordingly, the control unit 102 does not have to determine whether simple job cancellation is permitted whenever the stop key 304 is pressed and load of the control unit 102 can be reduced.

Third Embodiment

In the first and second exemplary embodiments, the example of restricting simple job cancellation with a stop key 304 when a single job is held in a memory unit 207 but is of a type that should not be easily deleted has been described.

In this way, mistakenly canceling the job can be prevented. However, depending on circumstances, users may want to delete a job that should not be easily deleted, such as a fax reception job or an automatic report job, with a simple operation.

Accordingly, a description will be given in a third exemplary embodiment for a control operation in which a job is canceled when the stop key 304 is pressed N times or more although simple job cancellation is not permitted for the job. The value N can be arbitrarily set by users. To prevent simple job cancellation caused by mistakenly pressing the stop key 304, the users may desirably set the value N to 3 or greater.

Figure 9:
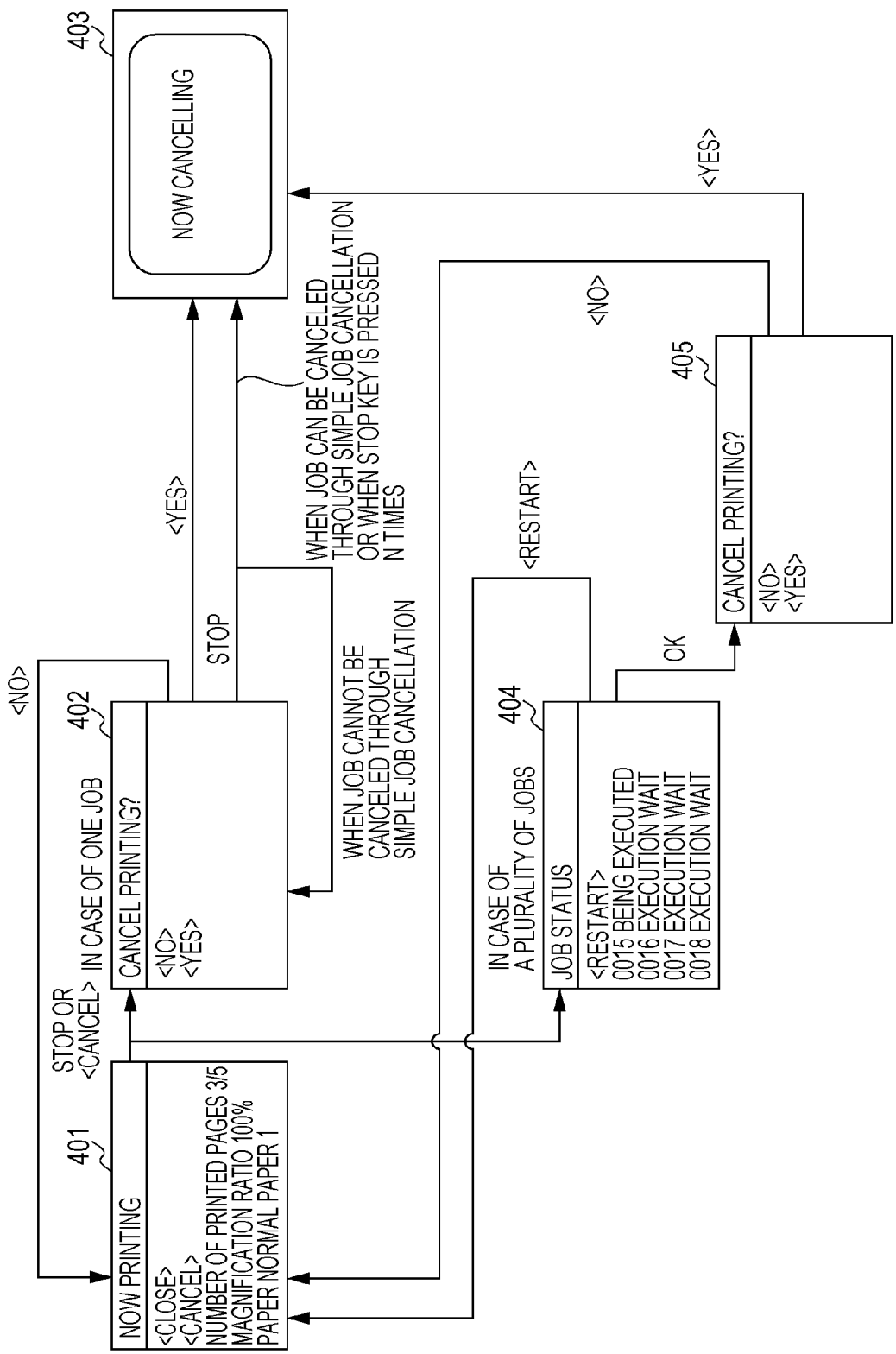
FIG. 9 is a diagram illustrating transition of screens displayed on an operation unit according to a third exemplary embodiment of the present invention.

A configuration of a job processing system (FIG. 1), a configuration of a control unit 102 (FIG. 2), a configuration of an operation unit 131 (FIG. 3), a screen displayed on the operation unit 131 (FIG. 4), a displayed screen of a job management table (FIGS. 5A and 5B) in accordance with the third exemplary embodiment are similar to those in accordance with the first and second exemplary embodiments. Although transition of screens displayed on the operation unit 131 is also almost the same as the one having been described with reference to FIG. 6, whether the stop key 304 is pressed N times or more is added to a condition for shifting a screen from a display screen 402 to a display screen 403 (FIG. 9).

A control flow in the third exemplary embodiment will be described with reference to a flowchart of FIG. 10. A CPU 201 of the control unit 102 reads out and executes a program stored in a ROM 202, whereby processing illustrated in the flowchart of FIG. 10 is performed.

First, in step S701, the control unit 102 detects pressing of the stop key 304. Upon detecting pressing of the stop key 304 in step 701, the control unit 102 temporarily suspends jobs held in the memory unit 207. The process then proceeds to step S702.

In step S702, the control unit 102 determines whether a single job or a plurality of jobs are held in the memory unit 207 on the basis of the job management table.

When the control unit 102 determines that a single job is held, the process proceeds to step S703. When the control unit 102 determines that a plurality of jobs are held, the process proceeds to step S711.

In step S703, the control unit 102 causes an LCD 135 to display the cancel confirmation screen 402 and stands by for an instruction from a user. Once the control unit 102 receives the instruction from the user, the process proceeds to step S704.

In step S704, the control unit 102 initializes a counter T, which counts the number of times the stop key 304 is pressed, to zero. The process then proceeds to step S705.

In step S705, the control unit 102 determines whether the stop key 304 is pressed. When the control unit 102 determines that the stop key 304 is pressed, the process proceeds to step S707. When the control unit 102 determines that the stop key 304 is not pressed, the process proceeds to step S706.

In step S707, the control unit 102 (functioning as a determining unit) determines whether simple job cancellation is permitted for the job to be cancelled. More specifically, the control unit 102 performs the determination using the methods having been described with reference to FIG. 6. When the control unit 102 determines that the simple job cancellation is permitted for the job to be cancelled, the process proceeds to step S709. Additionally, when the control unit 102 determines that the simple job cancellation is not permitted but the stop key pressing counter T indicates that the stop key 304 is pressed N times or more, the process also proceeds to step S709. In other cases, the process proceeds to step S708.

In step S708, the control unit 102 increments the counter T, which counts the number of times the stop key 304 is pressed, and the process then returns to step S705.

In step S709, the control unit 102 cancels the job held in the memory unit 207 and terminates the processing. At this time, the control unit 102 causes the LCD 135 to display the cancel execution screen 403.

On the other hand, when the process proceeds from step S705 to S706, the control unit 102 determines whether an instruction for canceling the job is received. More specifically, the control unit 102 determines whether a set key is pressed with <YES> in the cancel confirmation screen 402 being selected. When it is determined that the set key is pressed with <YES> being selected, the process proceeds to step S709. In step S709, the control unit 102 cancels the job held in the memory unit 207 and terminates the processing.

When it is determined that the set key is pressed with <NO> being selected, the process proceeds to step S710. In step S710, the control unit 102 restarts executing the job held in the memory unit 207 and terminates the processing. At this time, the control unit 102 causes the LCD 135 to display a status screen 401.

On the other hand, when the process proceeds from step S702 to step S711, the control unit 102 disables a cancellation instruction with the stop key 304 in step S711. That is, the control unit 102 performs control so that the job stored in the memory unit 207 is not canceled even when the cancellation instruction with the stop key 304 is received after step S711 until the processing of the flowchart illustrated in FIG. 10 terminates.

In step S712, the control unit 102 causes the LCD 135 to display a selection screen 404.

Next, in step S713, the control unit 102 determines whether the set key is pressed with <RESTART> being selected. When the control unit 102 determines that the set key is pressed with <RESTART> being selected, the process proceeds to step S710. In step S710, the control unit 102 restarts executing the job held in the memory unit 207 and terminates the processing.

On the other hand, when the set key is not pressed with <RESTART> being selected, the process proceeds to step S714 and the control unit 102 stands by until the set key is pressed with one of the plurality of jobs displayed in the selection screen 404 being selected.

When the control unit 102 determines that the set key is pressed with one of the plurality of jobs displayed in the selection screen 404 being selected, the process proceeds to step S715. In step S715, the control unit 102 causes the LCD 135 to display a cancel confirmation screen 405 and the process then proceeds to step S716.

In step S716, the control unit 102 determines whether an instruction for canceling the job is received. More specifically, the control unit 102 determines whether the set key is pressed with <YES> in the cancel confirmation screen 405 being selected. When it is determined that the set key is pressed with <YES> being selected, the process proceeds to step S709. In step S709, the control unit 102 cancels the job held in the memory unit 207 and terminates the processing.

On the other hand, when it is determined that the set key is pressed with <NO> being selected, the process proceeds to step S710. In step S710, the control unit 102 restarts executing the job held in the memory unit 207 and terminates the processing.

By performing control in this manner, deletion of an unintended job resulting from operation mistakes of users can be prevented since a job that should not be cancelled by the operation mistakes of the users is not cancelled as long as the stop key 304 is pressed N times or more. Additionally, when the users want to cancel a job that should not be easily cancelled, the users can easily execute the cancellation using the stop key 304.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192382, filed Aug. 30, 2010 which is hereby incorporated by reference herein in its entirety.

What is claimed is:

1. A job processing apparatus comprising:
a holding unit configured to hold a job; and
a control unit configured to cancel, in a case where the job held in the holding unit is a first type of job, the first type of job in accordance with receiving, using a confirmation screen, a first instruction for cancelling a job, and to cancel, in a case where the job held in the holding unit is a second type of job, the second type of job in accordance with receiving, using the confirmation screen, the first instruction for cancelling a job, the second type being different from the first type, wherein the control unit cancels, in a case where the job held in the holding unit is the first type of job, the first type of job in accordance with receiving, not using the confirmation screen, a second instruction for cancelling a job, and the control unit does not cancel, in a case where the job held in the holding unit is the second type of job, the second type of job in accordance with receiving, not using the confirmation screen, the second instruction for cancelling a job.

2. The job processing apparatus according to claim 1, wherein the second instruction is received in such a manner that a key for cancelling a job is selected twice.

3. The job processing apparatus according to claim 2, wherein the key is a hardware key.

4. The job processing apparatus according to claim 1, wherein the control unit cancels, in a state where the confirmation screen is displayed, in a case where the job held in the holding unit is the first type of job, the first type of job in accordance with receiving, not using the confirmation screen, the second instruction for cancelling a job, and the control unit does not cancel, in a state where the confirmation screen is displayed, in a case where the job held in the holding unit is the second type of job, the second type of job in accordance with receiving, not using the confirmation screen, the second instruction for cancelling a job.

5. The job processing apparatus according to claim 1, wherein the second type of job includes a facsimile reception job for receiving facsimile image data and performing printing based on the facsimile image data.

6. The job processing apparatus according to claim 1, wherein the second type of job includes an automatic report job for performing printing of a report which indicates history information of jobs which have been executed by the job processing apparatus.

7. The job processing apparatus according to claim 1, further comprising:

a setting unit configured to allow a user to set a type to the second type, wherein the control unit does not cancel, in a case where the job held in the holding unit is the second type of job of which type is set by the setting unit, the second type of job in accordance with receiving, not using the confirmation screen, the second instruction for cancelling a job.

8. The job processing apparatus according to claim 1, wherein the job held in the holding unit includes a copy job for performing printing based on image data which is generated by reading a document, a print job for performing printing based on image data which is received from an external apparatus, or a data transmission job for transmitting image data which is generated by reading a document to an external apparatus.

9. A control method for controlling a job executed by a job processing apparatus, the control method comprising:

cancelling, in a case where the job held in a holding unit is a first type of job, the first type of job in accordance with receiving, using a confirmation screen a first instruction for cancelling a job; and cancelling, in a case where the job held in the holding unit is a second type of job, the second type of job in accordance with receiving, using the confirmation screen, the first instruction for cancelling a job, the second type being different from the first type, wherein, in a case where the job held in the holding unit is the first type of job, the first type of job is canceled in accordance with receiving, not using the confirmation screen, a second instruction for cancelling a job, and in a case where the job held in the holding unit is the second type of job, the second type of job is not canceled in accordance with receiving, not using the confirmation screen, the second instruction for cancelling a job.

10. A non-transitory computer-readable storage medium for storing a computer program for controlling a job processing apparatus, the computer program comprising:

a code to hold a job in a holding unit; a code to cancel, in a case where the job held in the holding unit is a first type of job, the first type of job in accordance with receiving, using a confirmation screen, a first instruction for cancelling a job; and to cancel, in a case where the job held in the holding unit is a second type of job, the second type of job in accordance with receiving, using the confirmation screen, the first instruction for cancelling a job, the second type being different from the first type, wherein in a case where the job held in the holding unit is the first type of job, the first type of job is canceled in accordance with receiving, not using the confirmation screen, a second instruction for cancelling a job, and in a case where the job held in the holding unit is the second type of job, the second type of job is not canceled in accordance with receiving, not using the confirmation screen, the second instruction for cancelling a job.

* * * * *